United States Patent [19]
Steibel

[11] 4,450,759
[45] May 29, 1984

[54] STAND FOR FOWL ROASTING

[76] Inventor: James P. Steibel, 4822 - 57th Dr., Sturtevant, Wis. 53177

[21] Appl. No.: 489,724

[22] Filed: Apr. 29, 1983

[51] Int. Cl.³ .......................................... A47J 43/18
[52] U.S. Cl. ................................. 99/419; 99/426; 248/174; 211/189; D7/409
[58] Field of Search ................. 99/426, 427, 421 R, 99/419; D7/403, 409; D28/93; 211/33, 59.1, 189, 200; 248/174; 223/66; 16/114 R, 114 A; 297/442; 206/8

[56] References Cited

U.S. PATENT DOCUMENTS

| | | | |
|---|---|---|---|
| 163,202 | 5/1875 | Houston | 248/174 X |
| D. 253,156 | 10/1979 | Bengloff | 99/426 X |
| 1,540,358 | 6/1925 | Maurer | 16/114 A |
| 2,749,012 | 6/1956 | Beach | 248/174 X |
| 3,053,169 | 9/1962 | Rappaport | 99/421 |
| 3,379,118 | 4/1968 | Perez | 99/419 |
| 3,392,665 | 7/1968 | Harnest | 99/426 |
| 4,027,583 | 6/1977 | Spanek et al. | 99/421 H |

FOREIGN PATENT DOCUMENTS

| | | | |
|---|---|---|---|
| 118444 | 10/1901 | Fed. Rep. of Germany | 211/33 |
| 280539 | 12/1930 | Italy | 211/33 |
| 968908 | 9/1964 | United Kingdom | 16/114 A |

Primary Examiner—Billy J. Wilhite
Assistant Examiner—Christine A. Peterson
Attorney, Agent, or Firm—Arthur J. Hansmann

[57] ABSTRACT

A stand for fowl roasting and being arranged with two planar plates of flat material with slots therein for assembling the plates at right angles to each other. The plates have the same general profile, and they are retained in their right angle position by means of angulations or offsets at the ends of each of the two plates. Also, one plate has a slot therein for receiving a projection on a handle which can be attached and released from the assembled stand which itself can be disassembled for purposes of cleaning.

5 Claims, 8 Drawing Figures

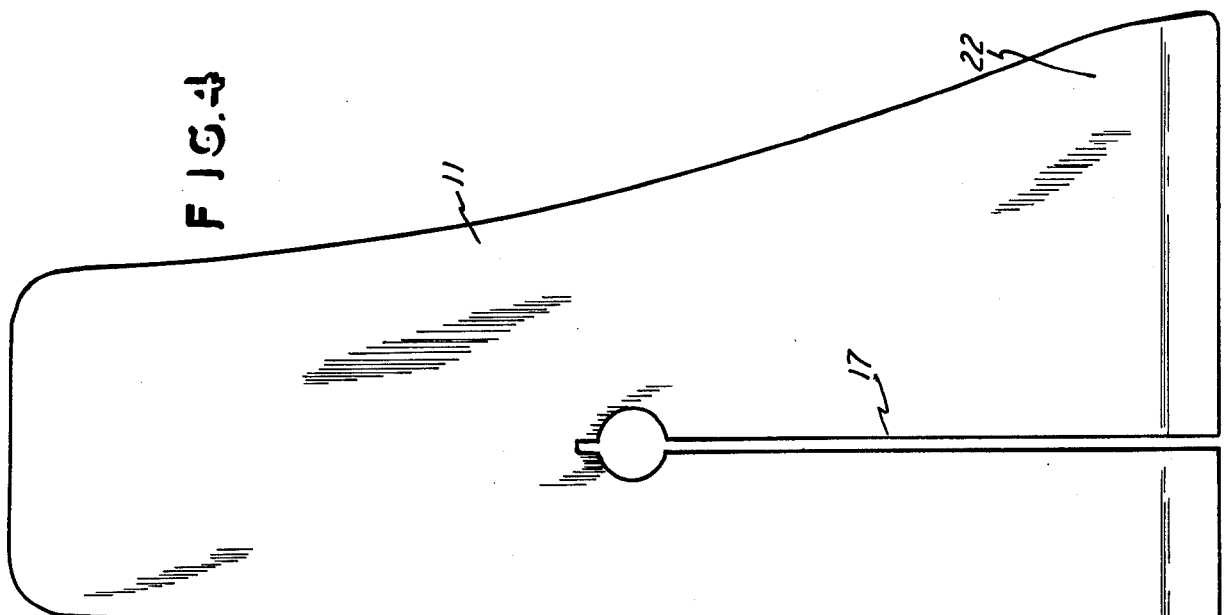
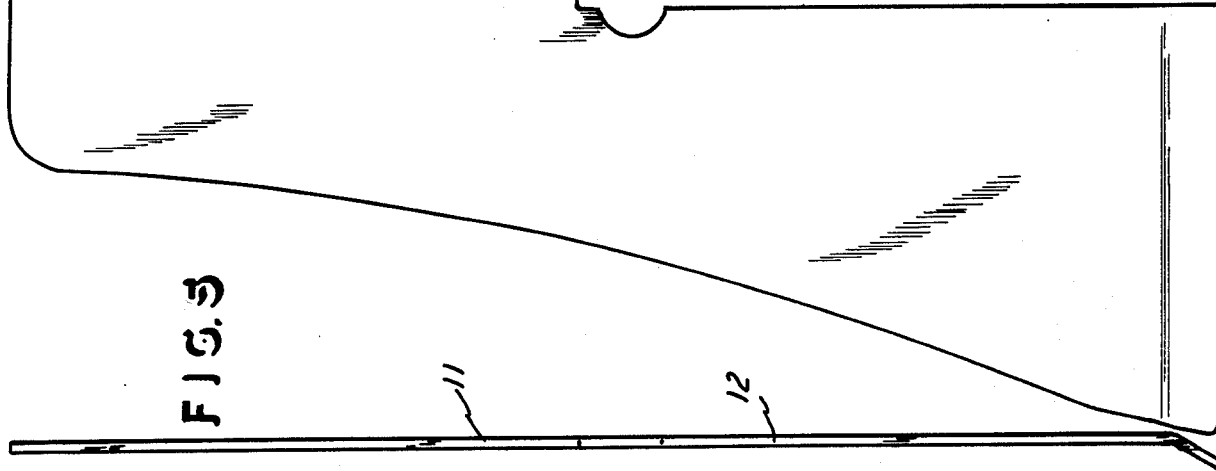
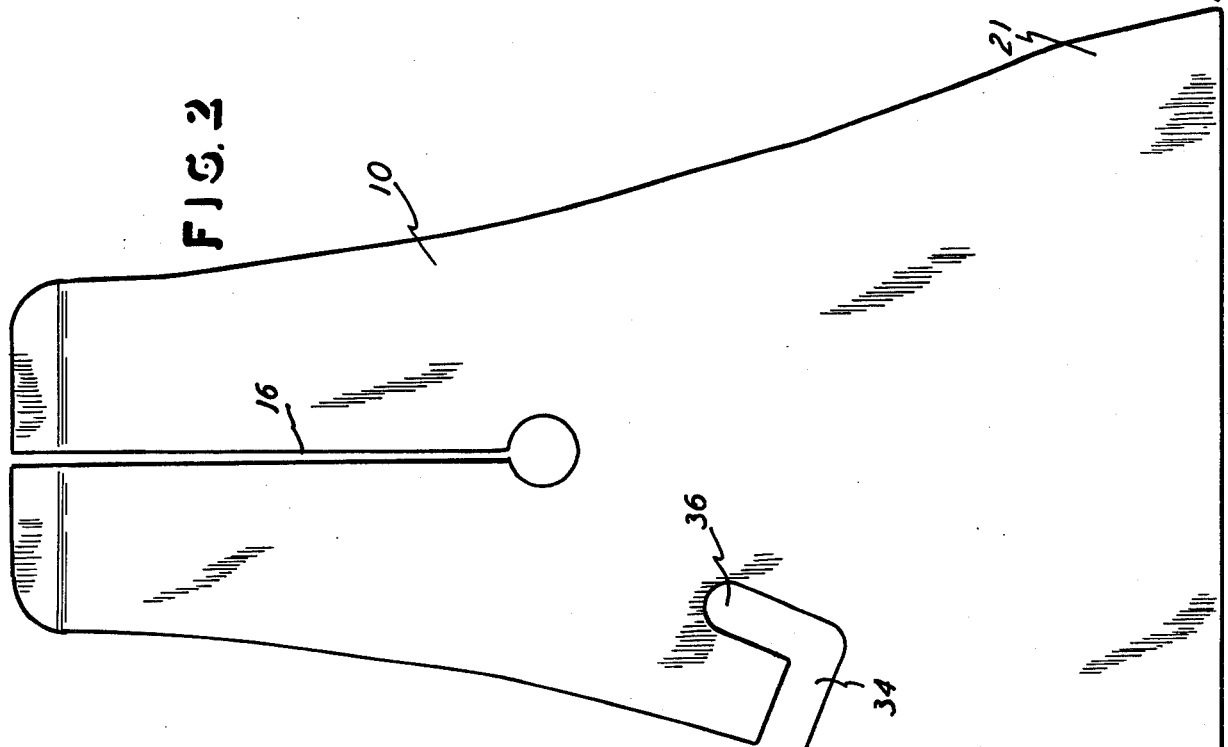
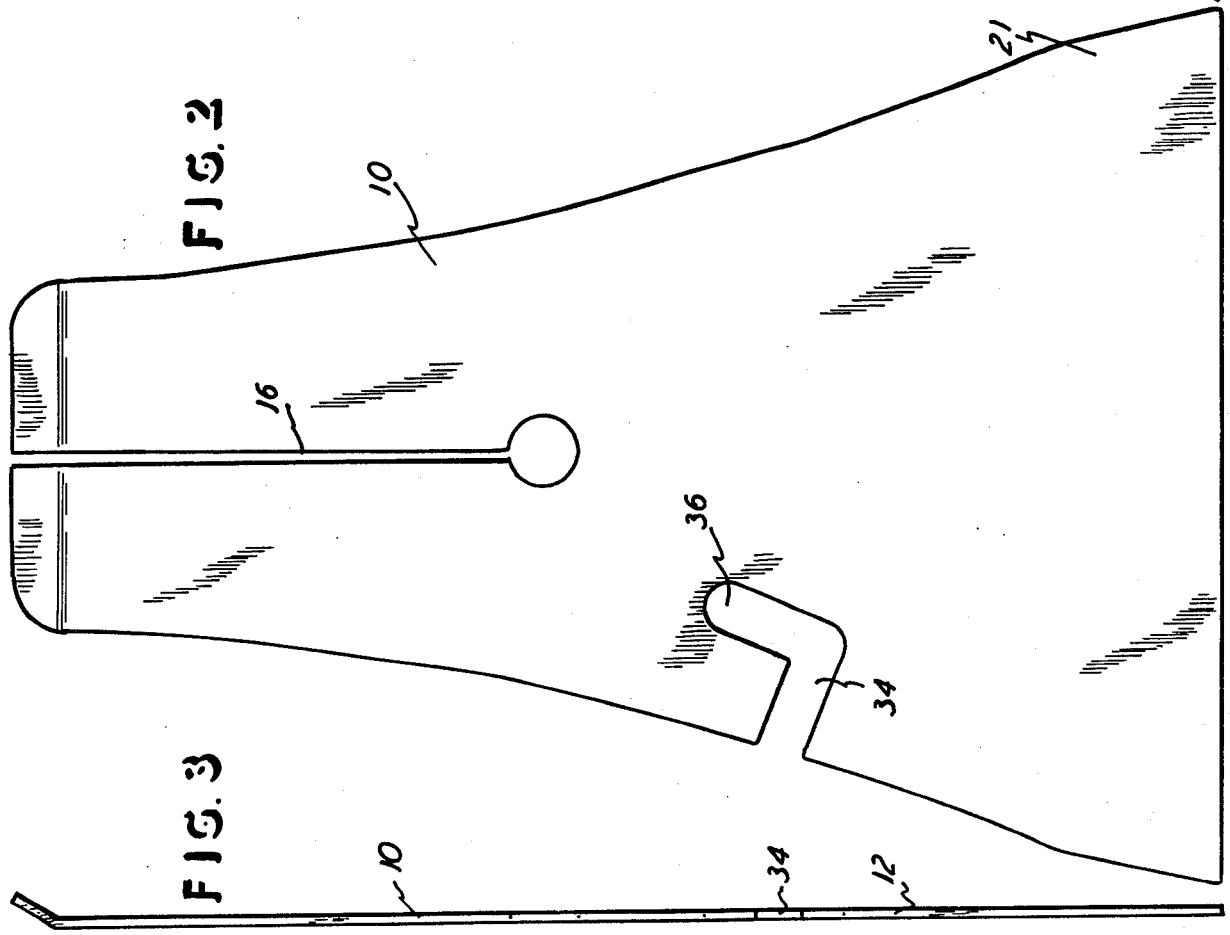

STAND FOR FOWL ROASTING

This invention relates to a stand for fowl roasting, and, more particularly, it relates to a stand or support for holding a chicken or the like in an upright position in an oven for roasting.

BACKGROUND OF THE INVENTION

The prior art is already aware of fowl roasting stands or supports of various constructions, such as those shown in U.S. Pat. Nos. 3,053,169 and 3,392,665 and 4,027,583. The prior art stands require a considerable number of parts which are secured together to form the final stand, and these parts present crevices and joints which render the stand difficult to store, manufacture, clean, and the like. Cleaning is a particular problem with stands which are constructed of wire since the fat draining from the fowl gets onto the wire and is baked thereon, and the wire construction presents joints and crevices which are extremely difficult to reach for purposes for cleaning. Also, the stands of the prior art are not stable in the self-standing position, and they are frequently not even constructed for self-standing on the common wire rack or shelf in an oven. Thus, such as with U.S. Pat. No. 3,392,665, an additional base or pan is required in order to support the stand in an upright operative position, and that is true of the other prior art arrangements where separate base pieces are required to render the stand self-supporting.

Accordingly, it is an object of this invention to provide an improved fowl roasting stand which is easy to manufacture and to assemble for the roasting position, and which is particularly easy to clean.

Still further, the stand of the present invention is arranged with sufficient heat conducting material, such as metal, so that the heat from the oven can be conducted to the metal and to the interior of the fowl which is supported on the heat conducting stand of this invention. In accomplishing this objective, the stand of this invention is made of two plates which are of continuous body for a substantial width so that sufficient heat conducting metal or the like is presented to the interior of the fowl for optimum roasting of the fowl.

A further object of this invention is to provide a simplified and yet improved fowl roasting stand with provisions for a removable handle which can be readily attached to the stand for removing the stand and the fowl from the oven.

Another object of this invention is to provide a fowl roasting stand which can be made exclusively from plate material, such as sturdy sheet metal, and thus the stand can be readily and easily manufactured and can be readily and easily assembled and disassembled and cleaned. Further, the stand of this invention is provided with an arrangement for retaining itself in the assembled position and which is self-supporting in the standing position.

BRIEF DESCRIPTION OF THE DRAWINGS

FIGS. 2 and 4 are front elevational views of the two plates of the stand of FIG. 1.

FIGS. 3 and 5 are side elevational views of FIGS. 2 and 4, respectively.

DETAILED DESCRIPTION OF THE PREFERRED EMBODIMENT

Figure 1:
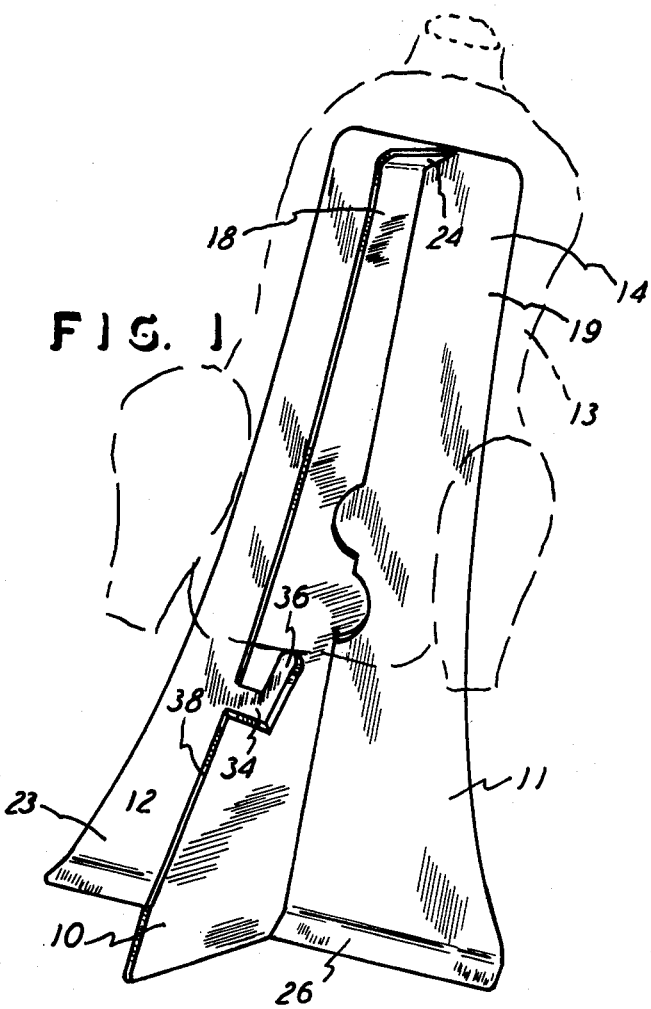
FIG. 1 is a perspective view of a fowl roasting stand of this invention.

FIG. 1 shows the rack consisting of two planar plates 10 and 11, of heat conducting material, such as metal like aluminum, steel, or the like. The plates are made of plate or sheet material and therefore extend in one plane, having a uniform thickness designated 12, with the uniformity extending throughout the plates 10 and 11, as shown. A fowl, such as a chicken indicated in dot-dash lines 13 is uprightly supported on the stand by having the stand upper end 14 slide into the lower cavity of the chicken 13 which therefore extends completely around the upper end 14 of the stand. As such, the stand and chicken can be placed into an oven for roasting.

By virtue of the heat conductivity and bulk of the plates 10 and 11 on the interior of the chicken 13, heat is conducted into the interior of the chicken by conductivity through the plates 10 and 11, and thus the interior of the chicken is roasted in an improved manner which has been found to produce a superior taste to the chicken. Also, because the plates 10 and 11 are planar and are thin in their thickness 12, they readily slide into the chicken 10, and the chicken 10 can also be readily removed from the plates 10 and 11, and there are no joints, crevices, or the like to have the chicken get stuck or hang onto the stand when removal is desired.

FIG. 1 further shows that the stand is made only of the two plates 10 and 11 which are self-supporting and positioned at right angles to each other by virtue of slots 16 and 17, respectively, in the plates 10 and 11, as seen in FIGS. 2 and 4. The slot 16 extends through the upper half of the plate 10, and the slot 17 extends through the lower half of the plate 11, and both slots are on the center plane or center line of the respective plate, as shown, and of course the slots extend completely through the plate thicknesses 12. With that arrangement, the plates can be slid together by joining them at their respective slots 16 and 17 so that the plates occupy the angulation, such as the right angle relationship described and which is shown in FIG. 1. The plates therefore positioned in respective vertical planes when they are in the assembled position shown in FIG. 1, and the plate upper ends 18 and 19, respectively of the plates 10 and 11, are narrower, as viewed in FIGS. 2 and 4, than is the dimension of the width 21 and width 22, respectively, of the plates 10 and 11, at the lower ends thereof. Further, the overall dimension and silouette of the two plates 10 and 11 is identical, as seen in FIGS. 2 and 4, so the two plates are basically identical in configuration.

As mentioned with respect to assembling the plates 10 and 11, they are readily assembled by sliding them together at the locations of their slots 16 and 17, and they are therefore also readily disassembled by sliding the plate 11 upwardly off the plate 10. Further, for the purpose of providing easy use of the stand as described, the upper end 18 is narrow, being only less than one-half the width of the base defined as 23, for the purpose of inserting the upper end 18 into the fowl, and also for the purpose of providing an adequate width base 23 for self-standing of the stand.

To preclude any possibility of the two plates 10 and 11 deviating from their right angle relationship, such as assuming a substantially parallel position to each other, the upper end 18 of the plate 10 has an offset designated 24, and the lower end 22 of the plate 11 has an offset designated 26. The offsets are angulations 24 and 26 with respect to the general respective planes of the main portions of the plates 10 and 11, such as clearly shown in FIGS. 3 and 5, and the angulation of the offsets is approximately 30 degrees, as shown. With those offsets 24 and 26, the plates will remain in the desired right angle relationship to each other and will not tend to collapse or turn toward a parallel relationship mentioned.

Figure 6:
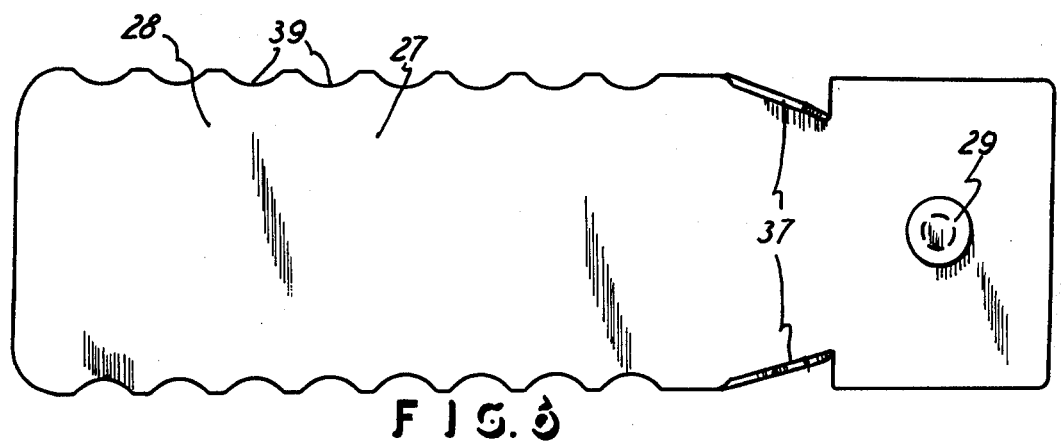
FIG. 6 is a top plan view of the handle used with the stand of FIG. 1.
Figure 7:
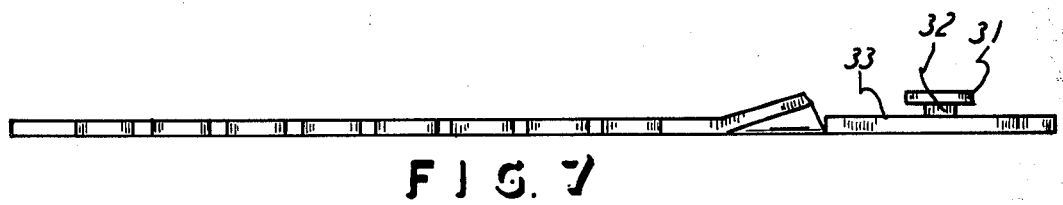
FIG. 7 is a side elevational view of FIG. 6.

FIGS. 6 and 7 show a handle 27 which is shown to be of a size related to the sizes shown in FIGS. 2 through 5. The handle 27 has a grip portion 28 and has a locking or button member 29 extending to one side thereof, as seen in FIG. 7. The button 29 has an outer flange 31 and an inner reduced neck 32 adjacent the handle main surface 33. With that arrangement, the handle 27 can be inserted into an angled slot 34 extending into the plate 10 from the edge thereof and terminating at an interior opening 36. Thus, the button 29 is positionable into the interior opening 36 to be snug therewith and thereby provides a handle for lifting the stand with the fowl thereon. Also, the handle 27 has upturned portions 37 which are available for abutting the edges 38 of the plate 10 when the handle button 29 is in the opening 36, and thereby secure the handle therein when lifting with the handle. Further, the handle is shown to have notches or serrations 39 along the opposite edges thereof to assure secure hand gripping of the handle. Finally, it will be seen and understood that the handle 27 is also made of planar or plate material, such as shown in FIG. 7, and the button 29 can be suitably formed therein or it can be added thereto in the nature of rivetting. The handle 27 is attachable and readily releasable relative to the stand, and it is therefore not subjected to the oven heat while roasting but can be applied only when needed for lifting. Further, FIG. 2 clearly shows that the handle opening 36 is in the plate 10 which has the slot 16 in the upper end, and thus the lifting force on the plate 10 by means of the handle 27 will likewise lift the plate 11 and thus the entire assembly is available for lifting by means of the projection 29 and the keyway 34 and 36.

An advantage of this stand is that the two plates can be readily manufactured from flat stock, and they can be readily assembled by sliding the slots 16 and 17 together, and a significant advantage is that the two plates 10 and 11 can be separated from each other and they are then only flat plates readily susceptible to cleaning. Also, the plate material is a heat conductor, so heat is conducted through the plate material and into the interior of the fowl. Further, the stand has the shape of a cone, in profile, and it thus easily penetrates the fowl, and, in fact, spreads the body of the fowl for optimum exposure in the roasting process.

Figure 8:
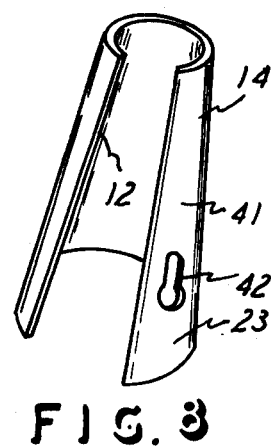
FIG. 8 is a perspective view of another embodiment.

FIG. 8 shows another embodiment, on a smaller scale, but showing the basic conical shape mentioned, with the upper end 14 being less than one-half the width of the lower end 23. Thus, there is a plate material 41 formed into a cone, as shown, to present the entire stand made from only plate material. Both embodiments have a tapered or cone shape as described herein. A keyway 42, as a handle receptacle, is in the metal 41 to receive the projection 29 of the handle 27.

What is claimed is:

1. A stand for fowl roasting, comprising only two planar plates which are slotted at opposite respective ends along the center planes thereof and with said plates being slidably related to each other in an assembled position, said plates intersecting each other at right angles at their respective slots for being self-standing, said plates being capable of disassembly by sliding each of said two plates off the other of said two plates, at least one of said two plates including a portion on one end thereof offset from the plane of the remainder of said one plate, said portion being disposed in abutment with the other of said two plates to thereby retain said two plates at right angles in said assembled position.

2. The stand for fowl roasting as claimed in claim 1, wherein said two plates are tapered from one end thereof and continuously to other end thereof, all for providing said other end as the upper end in the standing position, and with the upper extremity of the upper end being the narrowest of the entire said stand.

3. The stand for fowl roasting as claimed in claim 1, wherein said two slots exist in opposite upper and lower halves of respective ones of said plates, a handle, a projection on said handle, the one of said plates with the slot therein on the upper half also having a keyway opening extending therethrough for receiving said projection to thereby attach said handle to said one plate.

4. A stand for fowl roasting as claimed in claim 1, wherein the other of said two plates includes a portion on one end thereof offset from the plane of the remainder of said other plate, and with the latter said portion being disposed in abutment with the said one of the said two plates, and with the two said portions being at opposite ends of said stand.

5. A stand for fowl roasting, comprising two plates of flat material having uniform thickness and being planar and uprightly disposed, said plates being positioned in respective vertical planes at an angle to each other and having upright slots therein and being slid into said slots of each other with said plates being in a crossed position and thereby present an uprightly self-standing combination of said two plates, said plates being slidable away from each other for disassembly, the upper ends of each said plates being narrower than the lower respective ends thereof for inserting into a cavity in a fowl, and at least one of said two plates including a portion offset from the plane of the remainder of said one plate, and with said portion being within the extent of the height of the other of said two plates and in abutment with said other of said two plates to thereby retain said two plates in their said crossed position and avoid collapsing of said two plates toward each other.

* * * * *